Patented June 24, 1930

1,768,401

UNITED STATES PATENT OFFICE

HENRY A. GARDNER, OF WASHINGTON, DISTRICT OF COLUMBIA

TRANSLUCENT ARTIFICIAL SILK

No Drawing.      Application filed November 26, 1928.  Serial No. 322,094.

This invention relates to translucent artificial silk; and it comprises an improvement in the art of making artificial silk by extrusion of solutions of cellulose esters, such as the nitrate and the acetate, to form filaments and threads, wherein the transparency of the dried material finally produced is somewhat reduced by including in the solution a small proportion of a substance going out of solution as a dispersed solid in an early stage of the drying of the filament; said body being advantageously an aldehyde condensation product of a toluene sulphoamid; and it also comprises as a new material artificial silk of the type stated containing a dispersed, finely divided solid in sufficient amount to give a slight opalescence, with concomitant lessening of luster, said dispersed, finely divided solid being advantageously an aldehyde condensation product of a toluene sulphoamid; all as more fully hereinafter set forth and as claimed.

In the manufacture of artificial silk from nitrocellulose or cellulose acetate, the ester is converted into a solution which is extruded through spinnerets to form filaments which are afterwards solidified by evaporation of the solvent. In the case of nitrocellulose the solvent is often a mixture of ether and alcohol and the solution is as thick as will pass through the spinnerets. The filament leaving the spinneret gels by evaporation of the solvent. Ether being more volatile than alcohol, it evaporates preferentially and the solvent remaining with the nitrocellulose becomes progressively richer in alcohol. Cellulose acetate is often dissolved in a single solvent, acetone; but where a mixture of solvents is used the same phenomenon occurs; the most volatile solvent tends to evaporate first. In making artificial silk the solutions used are usually clear and transparent and the final dry filaments are transparent; giving fabrics therefrom having a high gloss or luster; often higher than is desired. It is the object of the present invention to provide a method of reducing this luster or gloss to a certain extent; and this is done by making the ultimate film or fiber of the artificial silk translucent, rather than transparent. In other words, I wish to give the fiber a certain internal haziness or opalescence.

By the present invention, I accomplish the object stated by charging the cellulose nitrate or acetate solution with a small proportion of a dissolved substance which will precipitate or become insoluble at an early stage of the evaporation of the solvent of the cellulose acetate or nitrate. With solutions having a mixture of solvents, the substance used should be one insoluble in the least volatile solvent present. In so doing, after the production of the thread by the spinneret and during the removal of solvents, there is a deposition of uniformly distributed finely divided material as a suspensoid in the body of the silk thread giving the desired internal haze. In case the artificial silk is to be made with a solution of nitrocellulose (pyroxylin) in ether-alcohol, any substance can be used to produce opalescence which is insoluble in alcohol but which can be dissolved in another readily volatile solvent miscible with ether-alcohol. During the drying, the added substance comes out of solution as its own solvent evaporates and the proportion of alcohol becomes larger. Many substances soluble in ether but not in alcohol can be used as additions, since, as stated, during the drying the ratio of ether to alcohol rapidly lessens; and the precipitation takes place prior to the formation of the final dry gel. Similarly, in making cellulose acetate silk from cellulose acetate dissolved in acetone, any acetone-insoluble substance can be admixed in another more volatile solvent, such as ether. Or substances soluble in acetone and insoluble in alcohol can be used if some alcohol is added to the cellulose acetate solution in acetone. During the drying, the acetone evaporates first and in the solvent the concentration of alcohol increases. While, as stated, a wide variety of substances can be used, I find that unusually advantageous results are secured by using a particular material; a resinous condensation product of formaldehyde with toluene sulphoamides and particularly such a condensation product from para toluene sulphoamide.

The amount of foreign substance to be incorporated in the silk under the present invention to produce opalescence or haze is always quite small, being generally of the order of about 5 per cent of the solid matter.

In a prior patent, 1,564,664, I have described and claimed the use of resinous toluene sulphoamide aldehyde condensation products as plastic materials and particularly in conjunction with nitrocellulose. In the procedure described and claimed, the two bodies, the nitrocellulose and the resinous material, are dissolved in a common solvent and clear composite films or filaments produced from the solution. The resinous product itself may have some solvent action on nitrocellulose. In the present invention I am using, in the best embodiment of my invention now known to me, the same type of resinous condensation body, but instead of having a final product in which this body is in homogeneous admixture with nitrocellulose (or with cellulose acetate), it occurs in my final composition as an opalescence-producing suspension or dispersoid. Instead of dissolving the nitrocellulose and the resinous condensation product in a common solvent, I dissolve the nitrocellulose in one of the usual solvents, such as ether-alcohol, and then mix this solution with a small proportion of a solution of the condensation product in acetone. Generally, I use a 10 per cent acetone solution of the condensation product and add to the nitrocellulose solution a sufficient amount of this solution to give about 5 per cent of the condensation product (based on the nitrocellulose). The acetone solution is readily miscible with the pyroxylin solution. On drying the extruded thread the acetone evaporates with the ether and the solvent remaining becomes rich in alcohol in which the resin is but little soluble. Prior to complete solidification of the thread the condensation product comes out of solution in the form of a colloid suspension. The same result can be accomplished in much the same way with a solution of cellulose acetate in a mixture of acetone and alcohol by adding an acetone solution of the condensation product. As evaporation goes on, the alcohol accumulates and the condensation product becomes insoluble prior to the final solidification of the cellulose acetate.

The best specific material for use in the present invention which I at present know is a condensation product of formaldehyde with para toluene sulphoamid. This substance forms white crystals with a melting point of about 156–160° C. It is substantially insoluble in water and in ethyl alcohol, but dissolves in acetone.

In a specific embodiment of the present invention, this material is dissolved in acetone to form a 10 per cent solution. Sufficient of this solution is admixed with an ordinary solution of pyroxylin in ether-alcohol to give 5 per cent of condensation product (based on the pyroxylin) and the mixed solutions are extruded in the ordinary way to form filaments and these filaments are dried. During the drying the ether and the added acetone evaporate and the condensation product is thrown out of solution by the accumulating alcohol; coming out as a uniformly distributed fine dispersoid, giving the cloudy effect here wanted. Under the conditions, it does not come out of solution as crystals or localized bodies which might disturb the strength of the filament. In a similar specific embodiment of my invention, the same acetone solution in the same proportion is added to a solution of cellulose acetate in a mixture of acetone and alcohol. The solvent mixture may contain 75 to 85 per cent acetone and 15 to 25 per cent alcohol. During the drying of extruded filaments formed from the mixture, the same type of precipitation occurs, giving the same type of cloudiness or haze or opalescence. With either the pyroxylin or the cellulose acetate filament, there is translucence instead of transparency in the final thread; the effect wanted.

After forming the cloudy or opalescent or translucent filaments according to the present method, they may be processed further in any of the ways usual to making artificial silk; pyroxylin threads being de-nitrated, etc., in the usual way to form skeins ready for trade.

While I have more particularly recited the application of the present invention to filaments of nitrocellulose and cellulose acetate, yet it can be used with filaments of any other cellulose ester or ether. The principle is the same; the conversion of the transparency of the usual filament into translucency.

What I claim is:

1. In delustering artificial silk formed by the extrusion process from solutions of cellulose esters and ethers, the process which comprises admixing with the solution prior to extrusion a small amount of a solution of a material adapted to go out of solution during drying of the extruded thread and to form a colloid suspension therein, the amount of such added solution being sufficient to afford an amount of material imparting a slight haze in the dried extruded material.

2. In delustering artificial cellulose ester and ether silks made by extrusion of a solution of the cellulose compound in a solvent comprising alcohol with subsequent drying of the extruded filaments, the process which comprises admixing with the solution prior to extrusion a small proportion of a solution of a condensation product of formaldehyde with a toluene sulphoamid.

3. In delustering artificial silk made by extrusion of solutions of nitrocellulose with subsequent drying of the extruded filaments, the process which comprises admixing with the nitrocellulose solution prior to extrusion a small proportion of a solution of a substance going out of solution during drying, the amount of such substance being merely that which will produce a haze in the final dried filament.

4. In delustering artificial silk made by extrusion of solutions of nitrocellulose in ether-alcohol with subsequent drying of the extruded filaments, the process which comprises admixing with the nitrocellulose solution a small proportion of an acetone solution of a condensation product of aldehyde with toluene sulphoamid.

5. In the delustering of solidified bodies formed from solutions of a cellulose ester dissolved in a mixture of volatile solvents, the process which comprises adding to the solution an organic compound which will be soluble in the admixed solvents but which will be thrown out of solution and produce a clouding effect by the precipitating action of the last solvent to evaporate, said solvent being a non-solvent of the organic compound employed.

6. A delustered artificial silk containing a toluene sulphoamid condensation product as a dispersoid phase.

In testimony whereof, I have hereunto affixed my signature.

HENRY A. GARDNER.